United States Patent [19]

Strauss

[11] Patent Number: 5,318,990
[45] Date of Patent: Jun. 7, 1994

[54] FIBROUS GLASS BINDERS

[75] Inventor: Carl R. Strauss, Newark, Ohio

[73] Assignee: Owens-Corning Fiberglas Technology Inc., Summit, Ill.

[21] Appl. No.: 79,412

[22] Filed: Jun. 21, 1993

[51] Int. Cl.$^5$ ............................................... C08F 8/14
[52] U.S. Cl. ................................... 524/549; 524/559; 524/560; 525/327.7; 525/329.6; 525/329.8; 525/340
[58] Field of Search ...................... 524/549, 559, 560; 525/340

[56] References Cited

U.S. PATENT DOCUMENTS

| | | | |
|---|---|---|---|
| 3,875,092 | 4/1975 | Morris | 525/340 |
| 3,912,672 | 10/1975 | Morris et al. | 525/340 |
| 5,008,345 | 4/1991 | Wolf | 525/340 |
| 5,089,555 | 2/1992 | Kitagawa et al. | 525/340 |
| 5,095,059 | 3/1992 | Kitamura et al. | 525/340 |
| 5,108,798 | 4/1992 | Guerro et al. | |
| 5,179,173 | 1/1993 | Fong et al. | 525/340 |

*Primary Examiner*—Bernard Lipman
*Attorney, Agent, or Firm*—Ted C. Gillespie; Charles H. Ellerbrock

[57] ABSTRACT

A fibrous glass binder comprises a polycarboxy polymer, a monomeric trihydric alcohol and catalyst comprising an alkali metal salt of a phosphorous-containing organic acid.

10 Claims, No Drawings

FIBROUS GLASS BINDERS

FIELD OF THE INVENTION

This invention relates generally to fibrous glass binders. More particularly, the invention is directed to a low viscosity binder for application to a fibrous glass mat, which binder rigidly cures to form a fibrous glass batt having excellent compression recovery characteristics.

BACKGROUND OF THE INVENTION

Fibrous glass insulation products generally comprise matted glass fibers bonded together by a cured thermoset polymeric material. Molten streams of glass are drawn into fibers of random lengths and blown into a forming chamber where they are randomly deposited as a mat onto a traveling conveyor. The fibers, while in transit in the forming chamber and while still hot from the drawing operation, are sprayed with an aqueous binder. A phenol-formaldehyde binder is currently used throughout the fibrous glass insulation industry. The residual heat from the glass fibers and the flow of air through the fibrous mat during the forming operation are generally sufficient to volatilize a majority of the water from the binder, thereby leaving the remaining components of the binder on the fibers as a viscous or semi-viscous high-solids liquid. The coated fibrous mat, which is formed in a compressed state due to the tremendous flow of air through the mat in the forming chamber, is then transferred out of the forming chamber to a transfer zone where the mat vertically expands due to the resiliency of the glass fibers. This vertical expansion is extremely important to the successful manufacture of commercially acceptable fibrous glass thermal or acoustical insulation products. Thereafter, the coated mat is transferred to a curing oven where heated air is blown through the mat to cure the binder and rigidly bond the glass fibers together.

Phenol-formaldehyde binders are widely used because they have a low viscosity in the uncured state, yet form a rigid thermoset polymeric matrix for the glass fibers when cured. A low binder viscosity in the uncured state is required to allow the maximum vertical expansion of the coated mat when it exits the forming chamber. A binder which forms a rigid matrix when cured is required so that a finished fibrous glass thermal or acoustical insulation product, when compressed for packaging and shipping, will recover to its as-made vertical dimension when installed in a building.

Insulation manufacturers have long desired an alternative polymeric binder system for fibrous glass products. However, low molecular weight, low viscosity binders which allow maximum vertical expansion of the mat in the transfer zone generally cure to form a non-rigid plastic matrix in the finished product, thereby reducing the attainable vertical height recovery of the finished insulation product when installed. Conversely, high viscosity binders which generally cure to form a rigid matrix in the finished product do not allow maximum vertical expansion of the coated, uncured mat.

U.S. Pat. No. 5,108,798 to Guerro et al. discloses a water soluble binder containing beta-hydroxy urethanes and polyfunctional carboxylic acids.

It would be desirable to prepare a non-phenol formaldehyde binder having a low viscosity when uncured and structural rigidity when cured.

SUMMARY OF THE INVENTION

Accordant with the present invention, a fibrous glass binder having the desired characteristics surprisingly has been discovered. The binder comprises:
 A) a polycarboxy polymer;
 B) a monomeric trihydric alcohol; and
 C) a catalyst, comprising an alkali metal salt of a phosphorous-containing organic acid.

Moreover, the invention is directed to a fibrous glass bat made with the inventive binder.

DETAILED DESCRIPTION OF THE PREFERRED EMBODIMENT

The binder according to the present invention comprises an aqueous solution of a polycarboxy polymer, a monomeric trihydric alcohol, and a catalyst. The viscosity of the binder is very low, due to the use of the monomeric trihydric alcohol crosslinking agent, and provides a maximized vertical expansion of the fibrous glass mat as it exits the forming chamber; similar to that vertical expansion provided by the well-known phenol-formaldehyde binders. Generally, the use of a monomeric reactant in a low viscosity curable resin results in a weak thermoset structure when cured. Surprisingly, it has been discovered that the catalyst of the invention allows the formation of a rigid thermoset when a resin comprising a polycarboxy polymer and a monomeric trihydric alcohol is cured.

The polycarboxy polymer of the present invention comprises an organic polymer or oligomer containing more than one pendant carboxy group. The polycarboxy polymer may be a homopolymer or copolymer prepared from unsaturated carboxylic acids including, but not necessarily limited to, acrylic acid, methacrylic acid, crotonic acid, isocrotonic acid, maleic acid, cinnamic acid, 2-methylmaleic acid, itaconic acid, 2-methylitaconic acid, $\alpha,\beta$-methyleneglutaric acid, and the like. Alternatively, the polycarboxy polymer may be prepared from unsaturated anhydrides including, but not necessarily limited to, maleic anhydride, itaconic anhydride, acrylic anhydride, methacrylic anhydride, and the like, as well as mixtures thereof. Methods for polymerizing these acids and anhydrides are well-known in the chemical art.

The polycarboxy polymer of the present invention may additionally comprise a copolymer of one or more of the aforementioned unsaturated carboxylic acids or anhydrides and one or more vinyl compounds including, but not necessarily limited to, styrene, $\alpha$-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether, vinyl acetate, and the like. Methods for preparing these copolymers are well-known in the art.

Preferred polycarboxy polymers comprise homopolymers and copolymers of polyacrylic acid.

Contemplated equivalent trihydric alcohols according to the present invention having the same operability and utility include, but are not necessarily limited to, glycerol, trimethylolpropane, trimethylolethane, triethanolamine, 1,2,4-butanetriol, and the like, as well as mixtures thereof. In practice, the monomeric trihydric alcohols of the present invention may be mixed with other polyhydric alcohols for use in the inventive binder composition. Such other polyhydric alcohols include, but are not necessarily limited to, ethylene glycol, 1,3-propanediol, 1,4-butanediol, 1,6-hexanediol, 2-butene-1, erythritol, pentaerythritol, sorbitol, and the like, as well as mixtures thereof.

Preferred monomeric trihydric alcohols comprise glycerol and trimethylolpropane, as well as mixtures thereof.

The catalyst according to the present invention comprises an alkali metal salt of a phosphorous-containing organic acid; particularly alkali metal salts of phosphorous acid, hypophosphorous acid, and polyphosphoric acids. Examples of such catalysts include, but are not necessarily limited to, sodium hypophosphite, sodium phosphite, potassium phosphite, disodium pyrophosphate, tetrasodium pyrophosphate, sodium tripolyphosphate, sodium hexametaphosphate, potassium phosphate, potassium polymetaphosphate, potassium polyphosphate, potassium tripolyphosphate, sodium trimetaphosphate, and sodium tetrametaphosphate, as well as mixtures thereof.

Preferred catalysts include sodium hypophosphite and sodium phosphite, as well as mixtures thereof.

The polycarboxy polymer, monomeric trihydric alcohol, and catalyst may be mixed with water in any conventional mixing device. The ratio of polycarboxy polymer to monomeric trihydric alcohol may be determined by comparing the ratio of moles of hydroxyl groups contained in the monomeric trihydric alcohol to the moles of carboxy groups contained in the polycarboxy polymer. This stoichiometric ratio may vary over wide limits from about 0.5 to about 1.5. Preferably, the ratio may vary from about 0.7 to about 1.0 One ordinarily skilled in the art will appreciate that the amount of catalyst used may also vary over wide limits depending upon the temperature at which the binder is cured as well as the time during which the binder is maintained at the elevated curing temperature. Only an amount of a catalyst sufficient to substantially cure the binder (i.e., react together greater than about 75% of the stoichiometrically available carboxy and hydroxyl groups) need be added to the binder mixture. Based upon the combined weight of the polycarboxy polymer, monomeric trihydric alcohol, and catalyst, the amount of catalyst required may vary over wide limits from about 1% to about 15% by weight. Preferably, the amount may vary from about 4% to about 8% by weight. Water may be added to the mixture of polycarboxy polymer, monomeric trihydric alcohol, and catalyst in any amount which would produce an aqueous binder having a viscosity and flow rate suitable for its application to a forming fibrous glass mat by any convenient method, such as by spraying. Conveniently, water may comprise up to about 95% by weight of the binder.

The binders of the present invention may optionally contain conventional adjuvants such as, for example, coupling agents, dyes, oils, fillers, thermal stabilizers, flame retarding agents, lubricants, and the like, in conventional amounts generally not exceeding 20% of the weight of the binder.

In operation, the inventive binder is applied to glass fibers as they are being produced and formed into a mat, water is volatilized from the binder, and the high-solids binder-coated fibrous glass mat is heated to cure the binder and thereby produce a finished fibrous glass bat which may be used as a thermal or acoustical insulation product, a reinforcement for a subsequently produced composite, etc.

It is generally well-known in the art to produce a porous mat of fibrous glass by fiberizing molten glass and immediately forming a fibrous glass mat on a moving conveyor. Glass is melted in a tank and supplied to a fiber forming device such as a spinner or a bushing. Fibers of glass are attenuated from the device and are blown generally downwardly within a forming chamber. The glass fibers typically have a diameter from about 2 to about 9 microns and have a length from about ¼ inch to about 3 inches. Preferably, the glass fibers range in diameter from about 3 to about 6 microns, and have a length from about ½ inch to about ½ inches. The glass fibers are deposited onto a perforated, endless forming conveyor. The binder is applied to the glass fibers as they are being formed by means of suitable spray applicators so as to result in a distribution of the binder throughout the formed mat of fibrous glass. The glass fibers, having the uncured resinous binder adhered thereto, are gathered and formed into a mat on the endless conveyor within the forming chamber with the aid of a vacuum drawn through the mat from below the forming conveyor. The residual heat contained in the glass fibers as well as the air flow through the mat causes a majority of the water to volatilize from the mat before it exits the forming chamber.

As the high-solids resin-coated fibrous glass mat emerges from the forming chamber, it expands vertically due to the resiliency of the glass fibers. The expanded mat is then conveyed to and through a curing oven wherein heated air is passed through the mat to cure the resin. Flights above and below the mat slightly compress the mat to give the finished product a predetermined thickness and surface finish. Typically, the curing oven is operated at a temperature from about 200° C. to about 325° C. Preferably, the temperature ranges from about 250° to about 300° C. Generally, the mat resides within the oven for a period of time from about ½ minute to about 3 minutes. For the manufacture of conventional thermal or acoustical insulation products, the time ranges from about ¾ minute to about 1½ minutes. The fibrous glass having a cured, rigid binder matrix emerges from the oven in the form of a bat which may be compressed for packaging and shipping and which will thereafter substantially fully recover its as-made vertical dimension when unconstrained. By way of example, a fibrous glass mat which is about 1 ¼ inches thick as it exits from the forming chamber, will expand to a vertical thickness of about 9 inches in the transfer zone, and will be slightly compressed to a vertical thickness of about 6 inches in the curing oven.

EXAMPLES

Binders containing the following ingredients are prepared and applied to fibrous glass as it is formed into a mat.

TABLE I

| BINDER INGREDIENTS | | |
|---|---|---|
| | Ingredients | Parts By Weight |
| Example 1* | Polyacrylic Acid (MW = 60,000) | 19 |
| | Polyacrylic Acid (MW = 2,100) | 56 |
| | Glycerol | 25 |
| | Sodium Hypophosphite | 6 |
| | Water | 900 |
| Example 2* | Polyacrylic Acid (MW = 60,000) | 16 |
| | Polyacrylic Acid (MW = 2,100) | 46 |
| | Trimethylolpropane | 38 |
| | Sodium Hypophosphite | 6 |
| | Water | 900 |
| Example 3* | Polyacrylic Acid (MW = 5,100) | 71 |
| | Glycerol | 29 |

TABLE I-continued

BINDER INGREDIENTS

| | Ingredients | Parts By Weight |
|---|---|---|
| | Sodium Hypophosphite | 6 |
| | Water | 900 |
| Example 4* | Polyacrylic Acid (MW = 5,100) | 62 |
| | Trimethylolpropane | 38 |
| | Sodium Hypophosphite | 6 |
| | Water | 900 |
| Comparison | Phenol-formaldehyde Resin | 100 |
| | Water | 900 |

*Small amounts of an aminosilane coupling agent and an oil emulsion for dust control are present The mats coated with the various binders vertically expand to approximately the same height as they exit the forming section. Thereafter the mats are slightly compressed to a thickness of about 6 inches while being cured using a flow of heated air at a temperature of about 275° C. The cured bats exhibit the following recoveries after being compressed for a period of about 3 weeks.

TABLE II

BAT RECOVERIES

| | Recovered Height (Inches) |
|---|---|
| Example 1 | 6.4 |
| Example 2 | 6.3 |
| Example 3 | 6.2 |
| Example 4 | 6.2 |
| Comparison | 5.9 |

What is claimed is:

1. A fibrous glass binder, comprising an aqueous solution of:
   A) a polycarboxy polymer comprising a homopolymer or copolymer prepared from an unsaturated carboxylic acid or an anhydride or mixtures thereof;
   B) a monomeric trihydric alcohol; and
   C) a catalyst, comprising an alkali metal salt of a phosphorous-containing organic acid.

2. The fibrous glass binder according to claim 1, wherein the polycarboxy polymer comprises homopolymers and copolymers of polyacrylic acid.

3. The fibrous glass binder according to claim 1, wherein the monomeric trihydric alcohol comprises glycerol.

4. The fibrous glass binder according to claim 1, wherein the monomeric trihydric alcohol comprises trimethylolpropane.

5. The fibrous glass binder according to claim 1, wherein the monomeric trihydric alcohol comprising a mixture of glycerol and trimethylolpropane.

6. The fibrous glass binder according to claim 1, wherein the catalyst is selected from the group consisting essentially of sodium hypophosphite and sodium phosphite, and mixtures thereof.

7. The fibrous glass binder according to claim 1, wherein the stoichiometrically equivalent amount of monomeric trihydric alcohol to polycarboxy polymer is from about 0.7 to about 1.0.

8. The fibrous glass binder according to claim 1, wherein the catalyst is present at a concentration from about 4% to about 8% by weight of the total weight of polycarboxy polymer, monomeric trihydric alcohol, and catalyst.

9. The fibrous glass binder according to claim 1, wherein water comprises up to about 95% by weight of the binder.

10. A fibrous glass binder, comprising an aqueous solution of:
    A) a homopolymer or copolymer of polyacrylic acid;
    B) a monomeric trihydric alcohol selected from the group consisting essentially of glycerol and trimethylolpropane, and mixtures thereof; and
    C) a catalyst selected from the group consisting essentially of sodium hypophosphite and sodium phosphite, and mixtures thereof.

* * * * *